F. E. DAVIS.
SEEDING MACHINE.
APPLICATION FILED JAN. 5, 1907.

1,073,666.

Patented Sept. 23, 1913.
5 SHEETS—SHEET 3.

Witnesses:
Chas. O. Sturvey
Wm. P. Bond

Inventor:
Frank E. Davis
By Fred Gerlach
his Attorney

F. E. DAVIS.
SEEDING MACHINE.
APPLICATION FILED JAN. 5, 1907.

1,073,666.

Patented Sept. 23, 1913.
5 SHEETS—SHEET 5.

Witnesses:
Inventor:
Frank E. Davis
by Fred Gerlach
his Atty

UNITED STATES PATENT OFFICE.

FRANK E. DAVIS, OF LA CROSSE, WISCONSIN.

SEEDING-MACHINE.

1,073,666.   Specification of Letters Patent.   Patented Sept. 23, 1913.

Application filed January 5, 1907. Serial No. 350,882.

*To all whom it may concern:*

Be it known that I, FRANK E. DAVIS, a resident of La Crosse, in the county of La Crosse and State of Wisconsin, have invented certain new and useful Improvements in Seeding-Machines, of which the following is a full, clear, and exact description.

The invention relates to seeding-machines.

In the operation of seeding-machines and grain-drills, it is frequently necessary to raise and lower the soil-openers to pass over obstructions or in passing over land on which no planting is to be done. It is desirable in this class of machines that the raising and lowering mechanism be susceptible of quick operation and will readily respond to the will of the operator so the machine in passing over the land will at all times be in either operative or inoperative position when desired. A readily operable lifting mechanism for the openers is advantageous in avoiding obstructions, passing over land without planting when such is desired, and frequent necessity of "backing" the machine to repass over the land at times. In this class of machines it is also necessary to employ pressure devices for holding the soil or furrow open at different depths to correspondingly deposit the seed and such pressure and locking-devices for securing the openers are usually associated with the lifting mechanism to hold the openers at different depths as well as in position to hold the openers in inoperative or "riding" position. It is also desirable to provide controlling means for seed-delivery devices which require no special attention of the operator and are always operative or inoperative, corresponding to the position of the openers. It is also desirable in machines of large sizes to arrange the openers in gangs susceptible of independent and conjoint operation.

One object of the present invention is to provide improved mechanism for raising and lowering the openers more quickly than may be done by hand or power and which, furthermore, leaves the hands of the operator free for controlling the team and for operating the pressure-devices when desired.

Another object of the invention is to provide improved shifting mechanism for the openers which is susceptible of operation by the foot of the operator *i. e.* a "foot-lift" mechanism.

The invention still further designs to provide a seeding machine in which the operation of the seed-delivery devices are foot-controlled in response to the foot-operated lifting-mechanism for the soil-openers, so that when the soil-openers are operated by the foot-lifting devices the seeding-mechanism will be correspondingly operated.

The invention also designs to provide foot-operated lifting mechanism for a machine having a plurality of gangs of openers whereby the gangs can be independently or conjointly operated.

The invention still further designs to provide a pressure-device for the openers which may be locked to hold the openers in the soil and which may be controlled by a foot-lever.

Another object is to provide a foot-operable lifting-mechanism for the openers which automatically holds the openers in raised position, so the use of locking mechanism is not necessary to secure the openers in such position when operating in the field.

The invention designs to provide a seeding-machine of improved construction.

The invention consists in the several novel features hereinafter set forth and more particularly defined by claims at the conclusion hereof.

In the drawings: Fig. 1ª is a detail showing the position of the lock and releasing-mechanism for the pressure-lever when the connections are in position shown in Fig. 1ᵇ. Fig. 1ᵇ is a view similar to Fig. 1, showing the openers and lifting-mechanism in position assumed when the openers have been raised by the foot-lever and the lock for the pressure-lever has been released. Fig. 2ª is a detail of the pressure-lever, its lock and the releasing-mechanism when the connections are in position shown in Fig. 2.

The machine is usually supported by carrying-wheels 8 in which is supported an axle or shaft 9 whereby the several parts of the machine are supported. This shaft is usually connected to the carrying-wheels by clutches or pawl and ratchets as well understood in the art, so that the shaft will be rotated only when the machine is drawn forwardly and so the shaft will not rotate when the machine is moved backwardly. A supporting-frame to which the draft-bar or tongue is usually secured comprises end-bars 10, a front bar 12, usually formed of angle-iron, a rear transverse bar 13 which is secured to and extends between the end bars 10, a central bar 17, and bars 19 secured to the front bar, all of which are rigidly connected in suitable manner to form a rigid frame by which the several parts of the machine are sustained. The frame is pivotally supported by the axle, being connected thereto by bearings 11' secured to the end bars, bearings 20 secured to bars 19 and a bearing 18 secured to central frame-bar 17. The frame and bearings may be of any suitable and well known construction. A seed-box 15 extends across the machine and is sustained by brackets (not shown) secured to end-bars 10 of the frame, and by straps 21 secured to the frame in any suitable manner.

Figure 3:
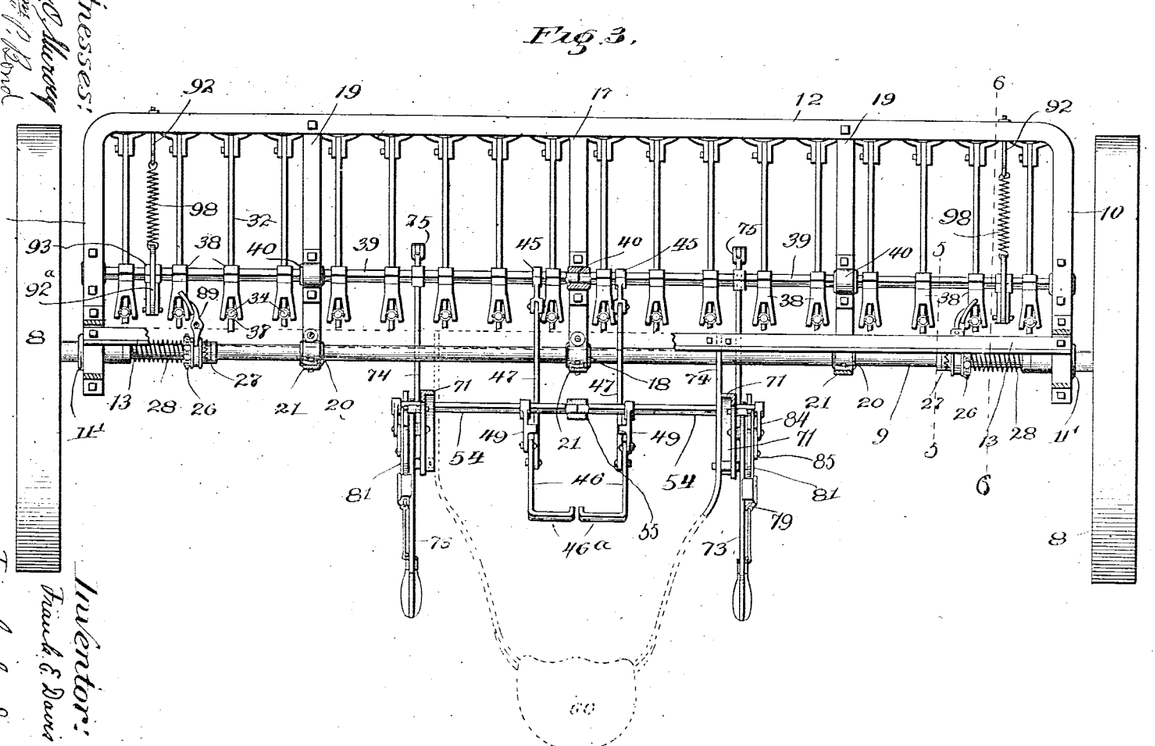
Fig. 3 is a plan, parts being removed and shown in section.
Figure 4:
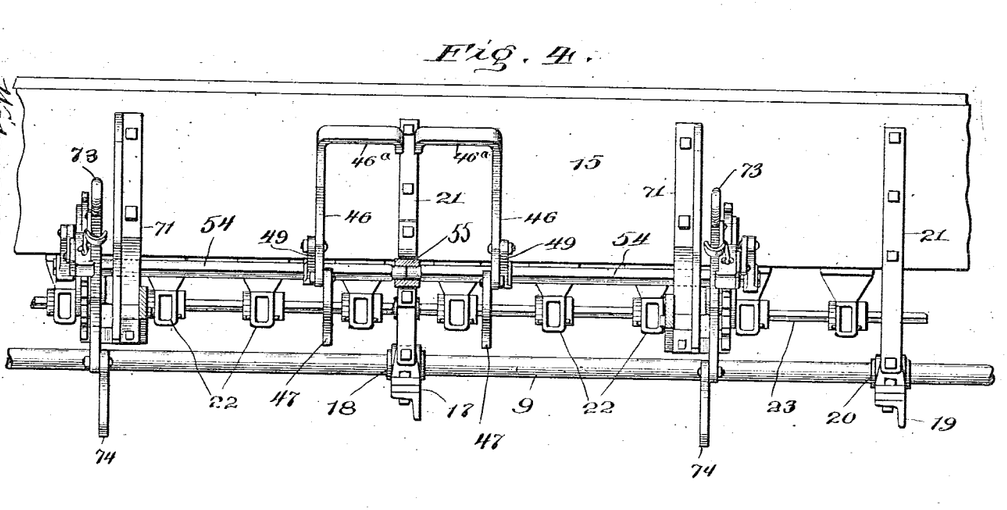
Fig. 4 is a rear elevation of a portion of the machine.
Figure 5:
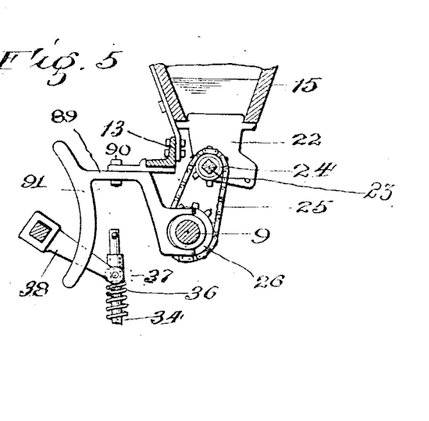
Fig. 5 is a detail of the controlling-mechanism for the seed-delivery devices, being a section on line 5—5 of Fig. 3.

In the lower portion of the seed-box are arranged a series of seed-delivery devices 22 which may be of any suitable and well known construction, as the particular construction of these devices forms no part of the present invention. These devices are operated by shafts 23 which extend through the seed-valves 22 and are each operatively and independently connected to the wheel-axle by a sprocket wheel 24 (see Figs. 3 and 5), chain 25 and a sprocket-wheel 26 mounted on the axle and adapted to be driven thereby under control of a clutch 27. Sprocket-wheel 26 is slidably mounted on the axle and is operatively connected thereto by clutch 27, the members whereof are secured to the axle and said sprocket-wheel respectively. A spring 28 yieldingly holds the clutch-members normally in connected relation. One of the seed-delivery shafts 23 operates the seed-delivery devices for one gang of openers and extends from the center of the machine to the end thereof and the other operates the delivery devices for the other gang and extends from the center of the machine to the other end thereof. The purpose being to permit the seed-devices to be operated in gangs corresponding to the soil-opener gangs.

Each of the clutches for driving the seed-delivery devices, is controlled by a shifter 89 which is pivoted as at 90 to a lug secured to frame-bar 13 and has a forked end adapted to shift sprocket-wheel 26 into and out of connection with clutch member 27. The shifter has a cam-surface 91 arranged to be shifted by one of the rock-shaft arms 38, to swing the shifter about its pivot 90 and disconnect the clutch members, said arm 38 and shifter 90 being operated when the furrow-openers are shifted and correspondingly cause the seed-delivery devices to be conjointly controlled with the openers to render said devices operative when the openers are operative and inoperative when the openers of the corresponding gang are.

A series of soil or furrow-openers are provided and in the construction shown each comprises a disk 30, a seed-boot 31 and a supporting drag-bar 32 which is independently pivoted at its upper and front end as at 33 to the frame. The boots and disk are connected to the drag-bars in manner well understood in the art, the disk being usually set at an angle to open the soil. The openers may be of any suitable construction and are arranged in gangs, each gang being capable of operation independently of the other. Flexible tubes 32ª each suspended from one of the seed-delivery devices 22 convey the seed discharged by the seed-valves into the boots.

The openers are arranged to be operated in gangs each usually extending from the center of the machine to the end thereof. Each drag-bar is movable independently of the others in traveling in the soil or over obstructions. Each drag-bar is connected to the lifting-mechanism by a rod 34 pivoted at 35 to the drag-bar and is slidably held in a trunnion-collar 37. A spring 36 is interposed between said collar and the drag-bar to provide an independently yielding connection for each opener. The trunnion-collars are each pivoted in the free end of an arm 38, secured to a rock-shaft 39. Rock-shafts 39 are journaled in bearings 40 and one of said shafts has secured thereto the arms 38 for one gang of openers and the other rock-shaft 39 has secured thereto the arms 38 for the other gang, each shaft extending from the center of the machine to the end of the frame. The purpose of employing independent rock-shafts for each soil-opener is to permit one of the gangs to be raised or lowered independently of the other when desired. In the field it is frequently desirable to operate one gang only e. g. when there is an obstruction to one or more openers, the lifting of one gang is all that is necessary while the other can remain operative.

Figure 6:
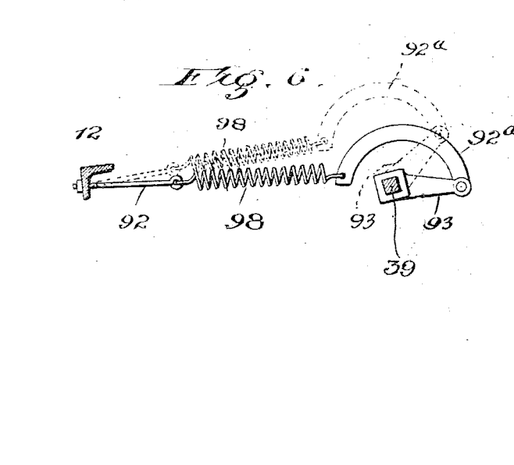
Fig. 6 is a detail section on line 6—6 of Fig. 1 of the spring-connection for aiding the operator in lifting the openers.

A spring 98 (see Figs. 3 and 6) may be applied to aid in lifting each of the gangs, each spring being connected to the frame by a bolt 92 and to a curved link 92ᵃ which is connected to an arm 93 on the rock-shafts respectively. The springs 98 also prevent the gangs from gravitating too suddenly when released by the holding-mechanism and are applied to exert greatest force when the openers are raised and little, if any, when the openers are in the soil.

A foot-lever and connection is provided for each gang whereby the openers thereof may be raised conjointly. These foot-operable mechanisms each comprise an arm 45 secured to the rock-shaft whereto the openers are connected, a foot-lever 46 and a connector or bar 47 which is pivotally connected to said arm and to an arm 46′ on the foot-lever. Each foot-lever is pivotally connected at 48 to an arm 49 which is rigidly secured to and near the inner end of a shaft 54 for controlling the pressure-lever lock and which is mounted in a bearing 55 secured to the frame in any suitable manner and in a bracket 77. Arm 49 serves as a movable fulcrum for the foot-lever so the latter will control the lifting connection and also operate the locking-device for the pressure-lever 73. The foot-lever and its connection provide a linkage which may be operated into "dead center" relation (see Fig. 1ᵇ) when the weight of the openers will be applied to hold the connection in position to automatically retain the openers in lifted position and without any locking-mechanism and independently of the pressure-lever and its lock.

Each foot-lever controls one gang of openers and has an angular end 46ᵃ for the foot of the operator. Both foot-levers are secured so they are disposed near the center of the machine, and are arranged so their angular ends can be conjointly depressed or released by one foot of the operator for his convenience when both gangs are to be simultaneously operated. A seat 60 for the operator is sustained in position to make it convenient for him to operate either the foot-lever or the pressure-levers, by supporting-bars 61 secured at their front ends to frame-bar 13 and also to hangers 71 which are secured to the seed-box.

A connection is also provided for each gang whereby the openers thereof may be operated by hand to raise or lower them in event the foot-operated connection becomes inoperative and to regulate or vary the pressure on the soil-openers according to the character of the soil in which the planting is being done, and to regulate the depth of planting. Pressure-levers 73 are adapted to be operated by hand and each is connected to one of the rock shafts 39 and opener-gangs by a link 74 which is connected to an arm 75 rigidly secured to rock-shaft. Each pressure-lever is pivotally sustained at 76 by a bracket 77 which is rigidly secured to the frame in any suitable manner, e. g., by being bolted to the hangers 71. The pressure-levers are arranged some distance from the center of the machine and in convenient reach of the operator. These pressure-levers are each adapted to be locked or secured to cause the rock-shafts for the openers to be held so the openers will travel in the soil at different depths and to vary the pressure applied to the openers by springs 36. These pressure-lever locks are automatically controlled by the foot-lever, i. e., when the foot-lever is operated to lift a gang it initially causes the release of the pressure-lever to free the openers and lifting-connections, so they can be operated. The pressure lever-lock is automatically operated by the foot-lever so no other operation is necessary to release the connections, thus rendering the lifting mechanism operable at all times by operation of the foot-lever alone and easily controllable by the operator without the use of his hand.

Each bracket 77 has teeth 78 which serve as a rack for holding the pressure-lever. A latch 79 is adapted to engage either of the teeth 78 to lock the pressure-lever and the operating connections for the rock-shaft 39 in assigned position when desired. Latch 79 is adapted to be operated manually in one direction by a finger-lever 80 which is pivotally connected to the pressure-lever near the free end thereof and is normally spring-pressed to engage the rack. Lever 73, link 74 and arm 75 form a connection for the rock-shaft whereby the openers of a gang can be raised or lowered by hand when desired and provide means for positively securing the rock-shaft in position to hold the openers in the soil at different depths. In practice it is frequently necessary to lock the rock-shaft and operating-connection when planting in hard soil or sod. At other times when working in loose or soft soil the weight of the openers is sufficient to cause them to penetrate the soil the desired extent.

In order to make it possible at all times to lift the gang by foot and particularly when the rock-shafts 39 are locked, a foot-lever controlled releasing plate 81 is provided for each pressure-lever, whereby, when it is desired to operate the foot-lever while the pressure-lever is locked, the latter will first be released to permit the rock-shafts and gangs to be operated by the foot-lever. This releasing-plate is provided with guide slots 83 through which extend bolts 82 to cause the plate to move inwardly or outwardly and its outer edge is concentrically formed with lever-pivot 76 so that the bolt of the latch 79 will be held out of engagement with the rack 78 to free the pressure-lever so the foot-lever and its connections can be operated to lift the openers. The releasing-plate is operated by arm 49 on which the foot-lever 46 is fulcrumed and which is secured to the controller-shaft 54, which has secured to its outer end an arm 84, connected by a link 85 to the releasing-plate. A stop 87 limits the movement of arm 84 in one direction (see Fig. 1ª) so that the foot-lever fulcrum 48 at the end of arm 49 will remain stationary at times. Arm 84 and link 85 are arranged to cross the "dead center" of their connections when the releasing-plate is in its outer or operative position and a spring 86 tends to hold the releasing-plate in either of its alternative positions.

When the foot-lever is operated to shift fulcrum-arm 49 and to rock controller-shaft 54, the releasing-plate will be correspondingly operated. Stop 49ª is provided on the fulcrum-arm 49 to prevent the foot-lever linkage from passing too far over the dead-center when holding the gangs in raised position. By reason of the locked or self retained relation of arm 84 and link 85, there is no tendency of the releasing-plate and its connections to disturb the "dead center" of the foot-lever linkage including arm 49. The rack is also provided with a notch 78ª by which the pressure-lever may be securely locked to lock the openers in lifted or "riding" position when the pressure-lever is shifted to cause the locking-bolt to enter said notch.

Figure 1:
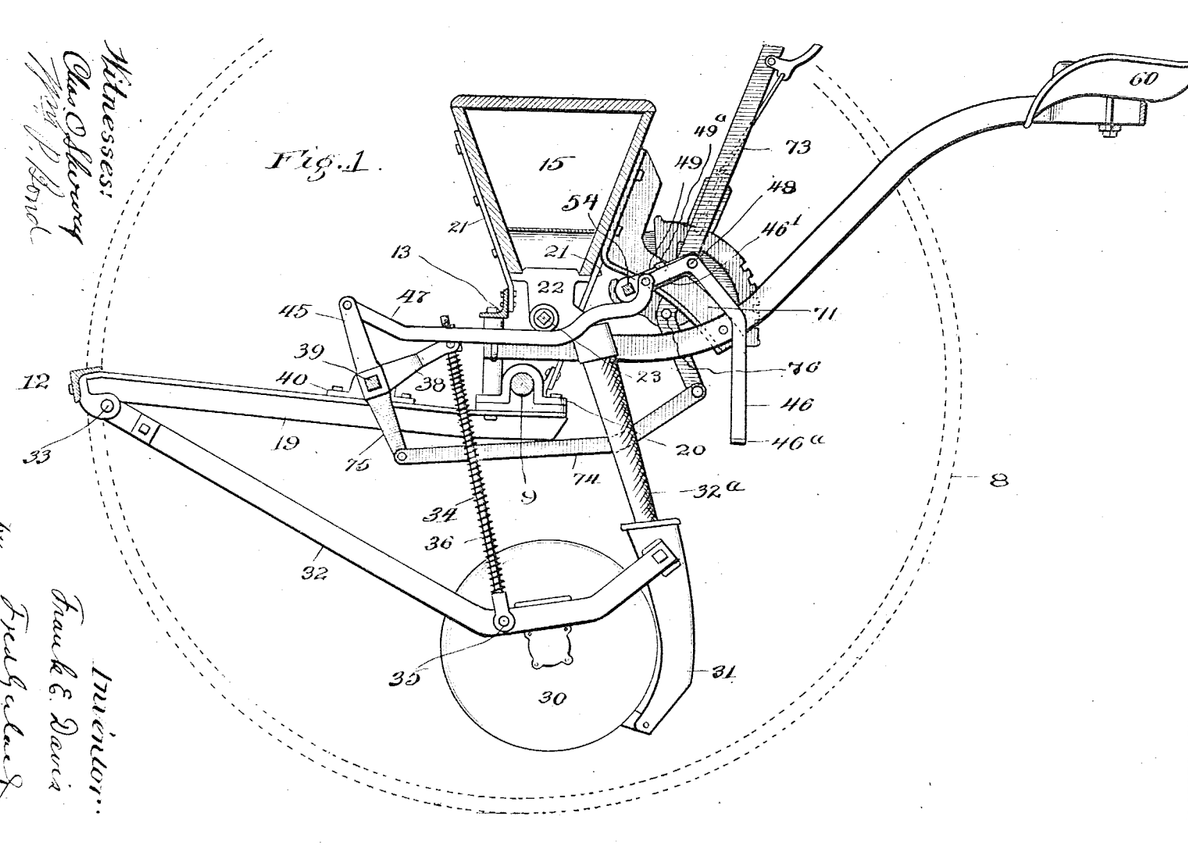
Figure 1 is a view in central vertical longitudinal section of a seeding-machine embodying the invention, the openers and lifting-mechanism being shown in position assumed when the openers have been raised by the hand-lever and locked in raised position by the hand-lever lock.
Figures 1A, 1B:
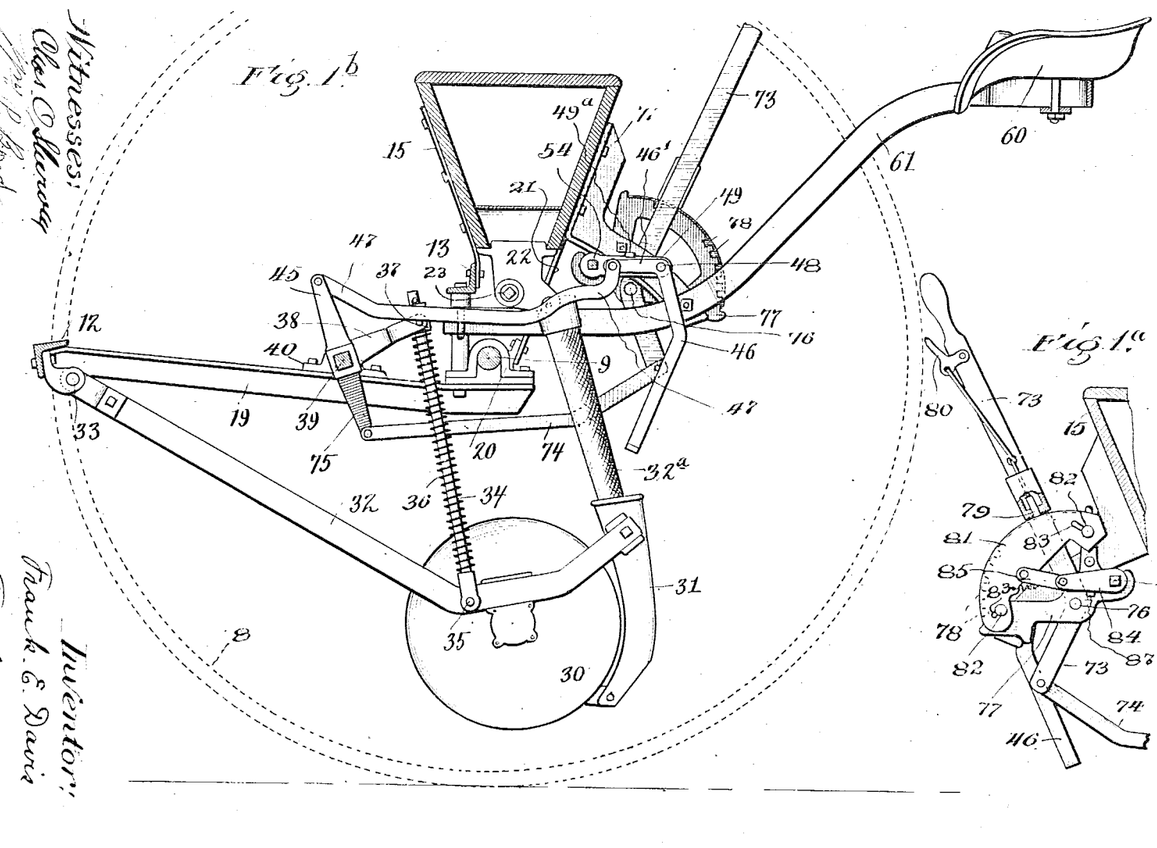
Figures 2, 2A:
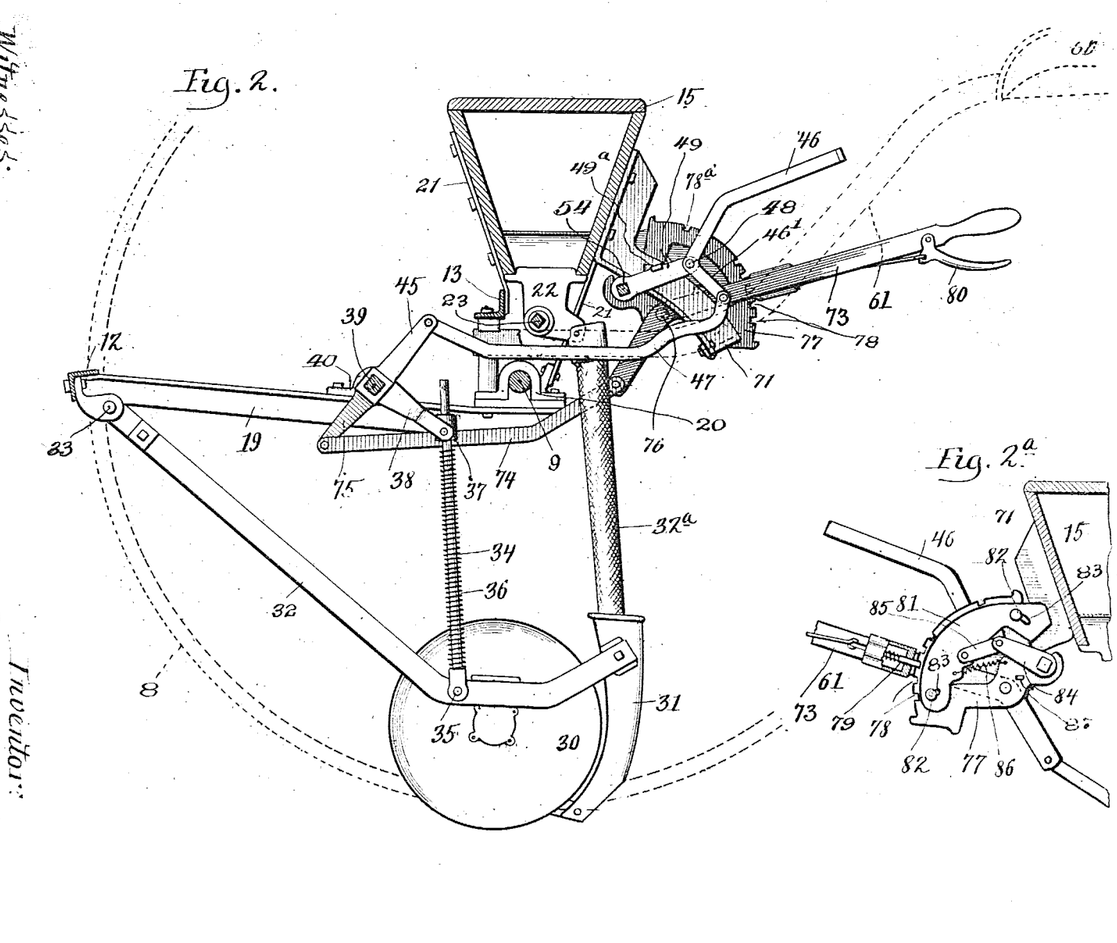
Fig. 2 is a longitudinal section of the machine, the lifting mechanism being shown in the position assumed when the furrow-openers are working in the soil and the pressure-lever locked to so hold them.

The operation of the device will be as follows: Assuming the parts to be in raised position, shown in Fig. 1ᵇ, the foot-lever and its lifting-connection will be in such position that the weight of the openers will be applied to hold said connections in position to hold the openers in raised position. In such position rock-shaft 39, arm 45, link-connector 47, foot-lever arm 46', and fulcrum 48 will be disposed so that arm 45 will tend to move rearwardly and hold the arm 46' of the foot-lever against stop 49ª on fulcrum-arm 49 without disturbing the controlling-connection for the lock-releasing means, the force of arm 46 being applied to the linkage 47, 46' and 48 substantially in the line of the fulcrum of arm 49. When the lifting-connections are in raised position as illustrated in Fig. 1ᵇ the lock-releasing plate will be in position illustrated in Fig. 1ª, and the pressure-lever will not be locked to rack 77, the releasing-plate being held in position to hold latch 79 disengaged from said rack. The position of the connections shown in Figs. 1ᵇ and 1ª is that assumed when the openers have been raised by the foot-lever 46 as is usually done in the field. When it is desired to lower the openers and to plant grain, the operator will place his foot under the free end of foot-lever 46 and lift it upwardly to shift arm 49 upwardly during the initial operation of the foot-lever. As arm 49 is raised by said foot-lever, the foot-lever linkage 46', 47, 45, crosses the dead-center so that the weight of the openers will be applied through said linkage to swing arm 46' downwardly while fulcrum-arm 49 is swinging upwardly to operate the releasing-plate 81 to release the pressure-lever lock 79 for engagement with rack-teeth 78. Resultantly of this initial lift of the foot-lever 46, the members of the foot-lever linkage will be disposed so that the openers will be free to and will fall to the ground and the releasing-plate 81, having been operated into position seen in Fig. 2ª, the pressure-lever 73 will be locked when latch 79 of the pressure-lever reaches the highest of the notches 78. Resultantly of the initial lifting-movement of the foot-lever 46 by the operator to swing the fulcrum-arm 49 upwardly, the openers will be released and fall to the ground and the pressure-lever will be locked in the highest of the notches 78 of the rack. If greater pressure upon the openers is desired, the hand-lever may be lowered and locked in a lower notch as shown in Fig. 2. It will be observed that when the openers are in the soil (Fig. 2) the foot-lever linkage is free to allow the rock-shaft and pressure-lever to be adjusted for planting at different depths.

When the rock-shaft for either gang of openers is lowered as a result of the operation of the foot-lever therefor, the arm 38 on rock-shaft 39 which controls the clutch for the driving-mechanism for the seed-delivery devices of the corresponding gang, will ride along cam-surface 91 to permit the shifter 89 to swing about its pivot 90 and spring 28 to operatively connect the clutch-members and cause them to operate the seed-delivery devices. Resultantly, the seed-delivery devices are controlled by the foot-lever and its lifting connections so the openers and seed-delivery devices will be simultaneously rendered operative or inoperative. To raise either gang of openers and discontinue planting, it is only necessary to operate the corresponding foot-lever 46 downwardly, which will cause the openers of a gang to be raised and the seed-delivery mechanism be rendered inoperative. Assuming the furrow-openers to be in lowered position seen in Fig. 2, the operator will depress the foot-lever which owing to the rock-shaft 39 being locked will cause fulcrum-arm 49 to operate into position seen in Fig. 1ᵇ. Said arm will during the initial movement of the foot-lever operate rock-shaft 54 to shift the releasing-plate 81 to release the pressure-lever and its lock. When arm 84 contacts with stop 87 further movement of the foot-lever in downward direction will cause it to swing about its fulcrum 48 (which is stopped by engagement of arm 84 with stop 87) until arm 46' has been shifted so the foot-lever linkage will pass into dead center relation and be held in position shown in Fig. 1ᵇ. The foot-lift connection will then be disposed so the soil-openers will be automatically held in raised position, and the releasing-plate will hold the pressure-lever lock in inoperative position (Fig. 1ᵇ).

Whenever it is desired to raise the furrow-openers by means of the hand-lever 73, e. g., if the foot-lever connection should become inoperative, and to lock the openers in raised position as shown in Fig. 1 for transportation, this may be done by means of a hand-lever 73. Assuming the furrow-openers to be lowered and the lifting-connections in position seen in Fig. 2 the operator will unlock the hand-lever 73 by means of finger-lever 80 and raise said lever until the latch 79 passes into notch 78ᵃ of the rack 77. This notch is disposed slightly beyond the point to which the latch passes when the furrow-openers are raised by the foot-lever 46 so that when the furrow-openers are raised by the foot-lever and its linkage, the latch will not pass into engagement with notch 78ᵃ. To lower the furrow-openers when they have been locked in raised position as shown in Fig. 1 it is only necessary to release the lever 73 from the rack so the furrow-openers will fall into the ground.

Manifestly, by the operation of the foot-lever in one direction, the soil-openers can be quickly and conveniently lifted so they will be automatically held in raised position when they are raised by the foot lever and by tripping the foot-lever the openers will be released to cause them to fall and enter the ground. The controlling-mechanism for the pressure-lever is timely operated by the foot-lever to secure the furrow-openers in the soil, and to permit the pressure-lever to be shifted by its operating connection, while the foot-lever is being operated.

If it is desired to render both gangs operative or inoperative simultaneously, the operator can conjointly and correspondingly operate both foot-levers with one foot, these being arranged for conjoint as well as independent control. If either foot-lever linkage should become broken or disarranged, the openers can still be controlled by the pressure-levers.

Having thus described the invention, what I claim as new and desire to secure by Letters Patent, is:

1. In a seeding-machine, the combination of carrying-wheels, a frame, seed-delivery means, soil-openers, a rock-shaft, a yielding connection between each of the openers and said shaft, a pressure-lever connected to said shaft, a foot-lever also connected to said rock-shaft, and for operating it to shift the openers, a lock for said pressure-lever, a cross shaft for operating the locking means, operable by the foot lever and lock-releasing means operated by the latter shaft to release the lock.

2. In a seeding-machine, the combination of carrying-wheels, a frame, seed-delivery means, soil-openers, a rock-shaft to which the openers are connected, a foot-lever, a connection between said shaft and the foot-lever and operable by the lever to shift the shaft, means for locking the shaft to hold the openers at different depths in the soil, a cross shaft for operating the locking means, operable by the foot lever and lock-releasing-means operated by the latter shaft to release the lock.

3. In a seeding-machine, the combination of carrying-wheels, a frame, seed-delivery means, soil-openers, a rock shaft to which the openers are connected, a pressure-lever operable by hand and connected to the rock-shaft, a foot-lever operatively connected to the shaft to operate the openers, means for locking the pressure-lever in different positions to hold the openers at different depths in the soil, a cross shaft operable by the foot lever and lock-controlling-means operated by the latter shaft to release the lock.

4. In a seeding-machine, the combination of carrying-wheels, a frame, seed-delivery-means, soil-openers, a rock-shaft, a yielding connection between each of the openers and said shaft, a pressure-lever operable by hand and connected to the rock-shaft, a foot-lever operatively connected to the shaft to operate the openers, a cross-shaft operable by the foot lever, means for locking the pressure-lever in different positions to hold the openers at different depths in the soil, and lock-controlling-means operated by the foot-lever to release the lock.

5. In a seeding-machine, the combination of carrying-wheels, seed-delivery-means, soil-openers, drag bars pivotally connected to the frame at their front ends and to which the soil openers are respectively connected, a rock-shaft to which the openers are connected, a foot-lever, and a lifting-connection between the shaft and the foot-lever operable by the foot-lever to raise the openers and comprising a linkage whereby the weight of the openers will be applied to cause the linkage to hold the connection in position to hold the openers in raised position.

6. In a seeding-machine, the combination of carrying-wheels, seed-delivery-means, soil-openers, drag bars pivotally connected to the frame at their front ends and to which the soil openers are respectively connected, a rock-shaft to which the openers are yieldingly and independently connected, a foot-lever and a lifting-connection between the shaft and the foot-lever operable by the foot-lever to raise the openers and comprising a linkage whereby the weight of the openers will be applied to cause the linkage to hold the connection in position to hold the openers in raised position.

7. In a seeding-machine, the combination of carrying-wheels, a frame, soil-openers, drag bars pivotally connected to the frame at their front ends and to which the soil openers are respectively connected, a rock-shaft to which the soil-openers are connected, a foot-lever, and a connection between said foot-lever and said rock-shaft comprising a linkage arranged to pass into "dead center" relation so the weight of the openers will be applied to cause the linkage to hold the connection in position to retain them in raised position thereby.

8. In a seeding-machine, the combination of carrying-wheels, a frame, seed-delivery means, soil-openers, drag bars pivotally connected to the frame at their front ends and to which the soil openers are respectively connected, a rock-shaft, a yielding connection between each of the openers and the rock-shaft, a foot-lever, and a connection between the foot-lever and the rock-shaft for operating the rock-shaft to shift the openers, comprising a linkage arranged to pass into "dead center" relation so the weight of the openers will be applied to the connection to hold it so the openers will be held in raised position.

9. In a seeding-machine, the combination of carrying-wheels, a frame, seed-delivery means, soil-openers, drag bars pivotally connected to the frame at their front ends and to which the soil openers are respectively connected, a rock-shaft to which the openers are connected, a foot-lever, a connection operable by the foot-lever and between the rock-shaft and the foot-lever for operating the shaft to shift the openers, said connection comprising a linkage adapted to pass into position to automatically hold the openers in raised position, and means for holding the openers in the soil.

10. In a seeding-machine, the combination of carrying-wheels, a frame, seed-delivery means, soil-openers, drag bars pivotally connected to the frame at their front ends and to which the soil openers are respectively connected, a rock-shaft to which the openers are connected, a yielding connection between each of the openers and the rock-shaft, a foot-lever, a connection operable by the foot-lever and between the rock-shaft and the foot-lever and for operating the shaft to shift the openers, said connection comprising a linkage adapted to pass into position to cause it to hold the openers in raised position, and means for holding the openers in the soil.

11. In a seeding-machine, the combination of carrying-wheels, a frame, seed-delivery-means, soil-openers, drag bars pivotally connected to the frame at their front ends and to which the soil openers are respectively connected, a rock-shaft to which the openers are connected, a foot-lever, a connection operable by the foot-lever and between the rock-shaft and the foot-lever for operating the shaft to shift the openers, said connection comprising a linkage adapted to pass into position to cause it to hold the openers in raised position, and means for locking the shaft to hold the openers in the soil.

12. In a seeding-machine, the combination of carrying-wheels, a frame, seed-delivery-means, soil-openers, drag bars pivotally connected to the frame at their front ends and to which the soil openers are respectively connected, a rock-shaft to which the openers are connected, a foot-lever, a connection operable by the foot-lever and between the rock-shaft and the foot-lever for operating the shaft to shift the openers, said connection comprising a linkage adapted to pass into position to cause it to hold the openers in raised position, means for locking the shaft to hold the openers in the soil, and lock-releasing-means.

13. In a seeding-machine, the combination of carrying-wheels, a frame, seed-delivery-means, soil-openers, drag bars pivotally connected to the frame at their front ends and to which the soil openers are respectively connected, a rock-shaft to which the openers are connected, a yielding-connection between each of the openers and rock-shaft, a foot-lever, a connection operable by the foot-lever and between the rock-shaft and the foot-lever and for operating the shaft to shift the openers, said connection comprising a linkage adapted to pass into position to cause it to hold the openers in raised position, and means for locking the shaft to hold the openers in the soil.

14. In a seeding-machine, the combination of carrying-wheels, a frame, seed-delivery-means, soil-openers, drag bars pivotally connected to the frame at their front ends and to which the soil openers are respectively connected, a rock-shaft to which the openers are connected, a yielding connection between each of the openers and rock-shaft, a foot-lever, a connection operable by the foot-lever and between the rock-shaft and the foot-lever and for operating the shaft to shift the openers, said connection comprising a linkage adapted to pass into position to cause it to hold the openers in raised position, means for locking the shaft to hold the openers in the soil, and lock-releasing means.

15. In a seeding-machine, the combination of carrying-wheels, a frame, seed-delivery-means, soil-openers, a rock-shaft to which the openers are connected, a foot-lever, a movable fulcrum for and shiftable by said foot-lever, and a connection between the rock-shaft and the foot-lever operable by the foot-lever to shift the openers.

16. In a seeding-machine, the combination of carrying-wheels, a frame, seed-delivery means, soil-openers, a rock-shaft, a yielding connection between the rock-shaft and each of the openers, a foot-lever, a movable fulcrum for and shiftable by the foot-lever, and a connection between said lever and the shaft operable by the foot-lever to shift the openers.

17. In a seeding-machine, the combination of carrying-wheels, a frame, seed-delivery means, soil-openers, a rock-shaft to which the openers are connected, a foot-lever, a movable fulcrum for said foot-lever, means controlled by said fulcrum for locking the rock-shaft, and a lifting-connection between the foot-lever and said shaft.

18. In a seeding-machine, the combination of carrying-wheels, a frame, seed-delivery means, soil-openers, a rock-shaft, a yielding connection between the rock-shaft and each of the openers, a foot-lever, a movable fulcrum for the foot-lever, means controlled by said fulcrum for locking the rock-shaft, and a lifting-connection between the foot-lever and said shaft.

19. In a seeding-machine, the combination of carrying-wheels, a frame, seed-delivery means, soil-openers, a rock-shaft, a foot-lever, a connection between said foot-lever and the rock-shaft for operating the rock-shaft to shift the openers and operable by the foot-lever, and a pivoted arm by which said lever is pivotally sustained, said arm being shiftable by said lever.

20. In a seeding-machine, the combination of carrying-wheels, a frame, seed-delivery-means, soil-openers, a rock-shaft to which the openers are connected, a foot-lever, a connection operable by the foot-lever between the foot-lever and the rock-shaft and for operating the rock-shaft to shift the openers into raised position where they will be held out of the ground, a hand-lever and a separate connection between the hand-lever and the rock-shaft, whereby the shaft may be operated either by the hand-lever or the foot-lever and locking means for the hand lever releasable by the foot lever.

21. In a seeding-machine, the combination of carrying-wheels, a frame, seed-delivery means, soil-openers, a rock-shaft to which the openers are connected, a yielding connection between the rock-shaft and each of the openers, a foot-lever, a connection operable by the foot-lever between the foot-lever and the rock-shaft and for operating the rock-shaft to shift the openers, a hand-lever, a separate connection between the hand-lever and the rock-shaft whereby the shaft may be operated either by the hand-lever or the foot-lever and locking means for the hand lever releasable by the foot lever.

22. In a seeding-machine, the combination of carrying-wheels, a frame, seed-delivery-means, soil-openers, a foot-lever, a connection between the foot-lever and the openers operated by the foot-lever and for shifting the openers, a pressure-lever, a lock for the pressure-lever, and means for releasing said lock connected to the foot-lever and comprising an arm to which the foot lever is pivoted.

23. In a seeding-machine, the combination of carrying-wheels, a frame, seed-delivery means, soil-openers, a foot-lever, a connection between the foot-lever and the openers operated by the foot-lever to lift the openers, a pressure-lever, a lock for the pressure-lever, means for controlling said lock connected to the foot-lever and comprising an arm and a shaft to which the arm is secured, and a connection between said shaft and the locking-means.

24. In a seeding-machine, the combination of carrying-wheels, a frame, seed-delivery means, soil-openers, drag bars pivotally connected at their front ends to the frame and on which the openers are mounted respectively, a foot-lever, a rock-shaft to which the openers are independently connected, a connection between the shaft and said lever and for shifting said shaft, locking-means for said shaft, and means independent of said locking means, for holding the openers in raised position.

25. In a seeding-machine, the combination of carrying-wheels, a frame, seed-delivery means, soil-openers, drag bars pivotally connected at their front ends to the frame and on which the openers are mounted respectively, a foot-lever, a rock-shaft to which the openers are independently connected, a connection between the shaft and said lever for shifting said shaft, means for locking the shaft to hold the openers in the soil at different depths, and means independent of said locking-means for holding the openers in raised position.

26. In a seeding-machine, the combination of carrying-wheels, a frame, seed-delivery means, soil-openers, drag bars pivotally connected at their front ends to the frame and on which the openers are mounted respectively, a foot-lever, a rock-shaft to which the openers are yieldingly and independently connected, a connection between the shaft and said lever for shifting said shaft, means for locking the shaft to hold the openers in the soil at different depths, and means independent of said locking-means for holding the openers in raised position.

27. In a seeding-machine, the combination of carrying-wheels, a frame, seed-delivery means, soil-openers, a foot-lever, a rock-shaft to which the openers are independently connected, a connection between the shaft and said lever and for shifting said shaft, means for locking the shaft to hold the openers in the soil, and means operable by the foot lever for holding the locking-means inoperative when the openers are raised.

28. In a seeding-machine, the combination of carrying-wheels, a frame, seed-delivery means, soil-openers, a foot-lever, a rock-shaft to which the openers are independently connected, a connection between the shaft and said lever and for shifting said shaft, means for locking the shaft to hold the openers in the soil, and means operable by the foot lever for holding the locking means released when the openers are in raised position.

29. In a seeding-machine, the combination of carrying wheels, a frame, seed-delivery means, soil-openers, a foot lever, a rock-shaft to which the openers are independently connected, a connection between the shaft and said lever and for shifting said shaft, means for locking the shaft to hold the openers in the soil, and means operable by the foot lever for releasing the lock after the openers have been lowered.

30. In a seeding-machine, the combination of carrying-wheels, a frame, seed-delivery-means, soil-openers, a foot-lever, a rock-shaft to which the openers are independently connected, a connection between the shaft and said lever and for shifting said shaft, means for locking the shaft to hold the openers in the soil and means for permitting the lock to operate when the openers are in lowered position and to render it inoperative when the openers are raised by the foot-lever, said means being operable by the foot lever.

31. In a seeding-machine, the combination of carrying-wheels, a frame, seed-delivery means, soil-openers, a foot-lever, a rock-shaft to which the openers are independently connected, a connection between the shaft and said lever and for shifting said shaft, means for locking the shaft to hold the openers in the soil, means operable by the foot lever for holding the locking-means inoperative, and means whereby the lock will be rendered inoperative before the openers have been raised by the foot-lever.

32. In a seeding-machine, the combination of carrying-wheels, a frame, seed-delivery-means, soil-openers, a foot-lever, a rock-shaft to which the openers are connected, a connection between the shaft and said lever for shifting said shaft, a pressure-lever, locking-means for the pressure-lever, lock-releasing means operable by the foot-lever, and means for automatically operating the releasing-means when the foot-lever is operated to raise the openers.

33. In a seeding-machine, the combination of carrying-wheels, a frame, seed-delivery-means, soil-openers, a foot-lever, a rock-shaft to which the openers are connected, a connection between the shaft and said lever for shifting said shaft, a pressure-lever, locking-means for the pressure-lever, lock-releasing means operable by the foot lever, and means for automatically operating the releasing-means when the foot-lever is operated to lower the openers.

34. In a seeding-machine, the combination of carrying-wheels, a frame, seed-delivery-means, soil-openers, a foot-lever, a rock-shaft to which the openers are connected, a connection between the shaft and said lever for shifting said shaft, a pressure-lever, locking-means for the pressure-lever, lock-releasing means, and means for automatically operating the releasing-means when the foot-lever is operated to raise or lower the openers.

35. In a seeding-machine, the combination of carrying-wheels, a frame, seed-delivery means, soil-openers, a foot-lever, a rock-shaft to which the openers are connected, a connection between the shaft and said lever for shifting said shaft, locking-means for said shaft, means independent of said locking-means for holding the openers in raised position, and means operated by the foot-lever to first release the lock and to hold it in unlocked position while the openers are raised and until the openers have been lowered.

36. In a seeding-machine, the combination of carrying-wheels, a frame, seed-delivery means, soil-openers, a rock-shaft to which the openers are connected, a foot-lever operatively connected to the shaft, locking-means for said shaft, and means independent of said locking-means for holding the openers in raised position, and means operated by the foot-lever to first release the lock and to hold it released while the openers are raised and until the openers have been lowered and then to permit the pressure-lever to be locked to hold the openers in the soil.

37. In a seeding-machine, the combination of carrying-wheels, a frame, seed-delivery means, soil-openers, a rock-shaft to which the openers are independently connected, a foot-lever, a link-connection between the foot-lever and the rock-shaft for operating the rock-shaft to shift the openers, an arm to which the foot-lever is connected, a lock for securing the shaft against rotation, lock-releasing means operated by said arm, and means operated by the foot-lever for swinging said arm to operate the releasing-means.

38. In a seeding-machine, the combination of carrying-wheels, a frame, seed-delivery means, soil-openers, a rock-shaft to which the openers are connected, a foot-lever, a link-connection between the foot-lever and the rock-shaft for operating the rock-shaft to shift the openers, an arm whereto said foot-lever is connected, a pressure-lever, a lever-lock, lock-releasing means operated by said arm, and means operated by the foot-lever for swinging said arm.

FRANK E. DAVIS.

Witnesses:
D. D. MARSHALL,
C. W. DICKINSON.